Aug. 9, 1932. E. A. ROCKWELL 1,870,652
DEPTH TESTING AND INDICATING DEVICE
Filed Dec. 7, 1927 3 Sheets-Sheet 1
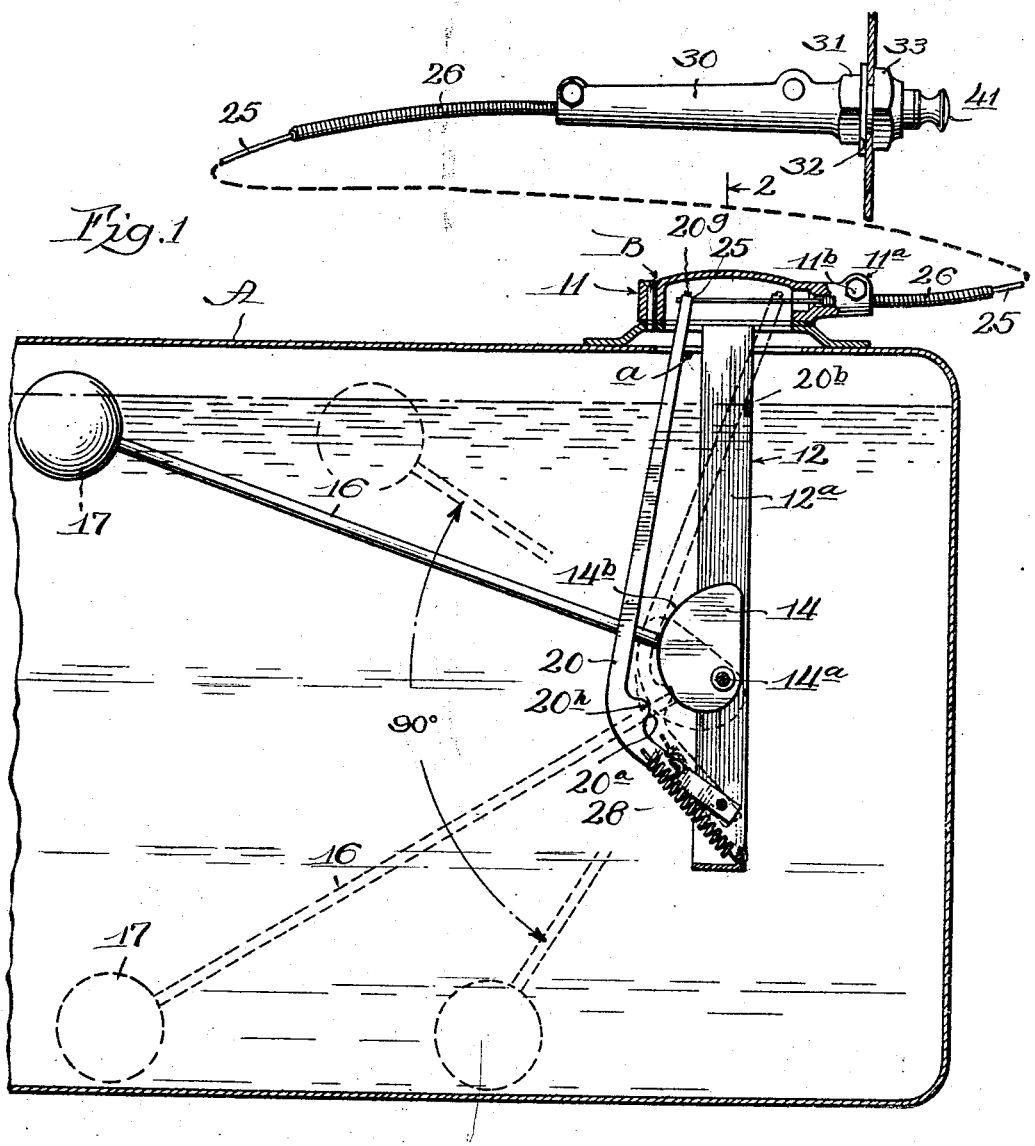
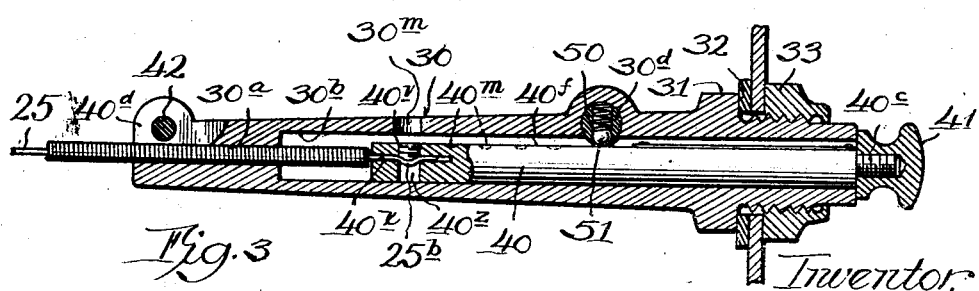
Witness: Chas. R. Foursh.
Inventor,
Edward A. Rockwell,
by Burton Burton Attys Aug. 9, 1932.  E. A. ROCKWELL  1,870,652
DEPTH TESTING AND INDICATING DEVICE
Filed Dec. 7, 1927  3 Sheets-Sheet 2
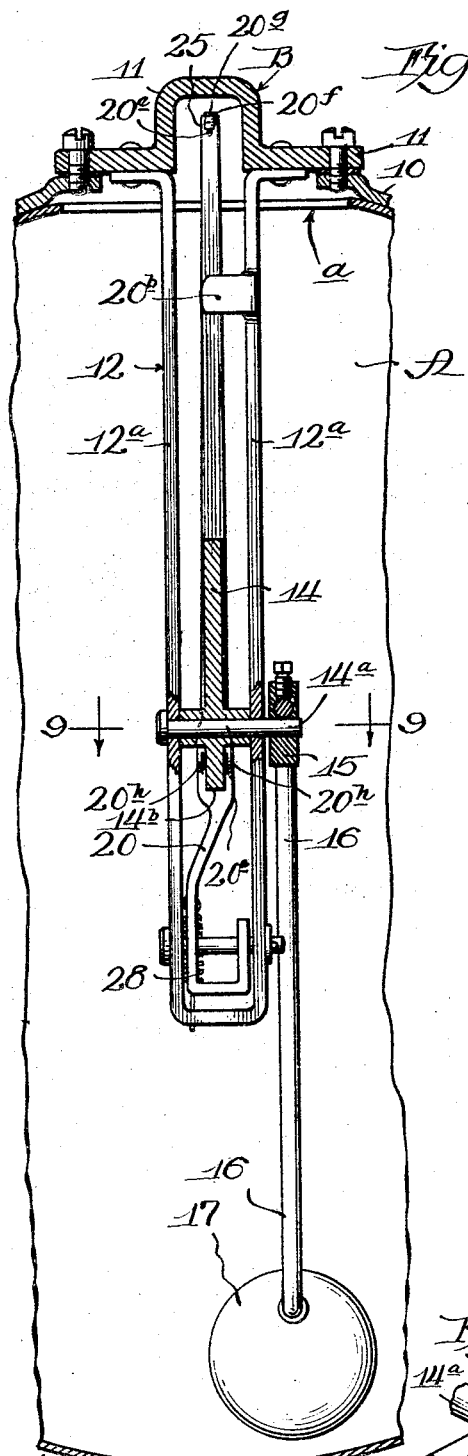
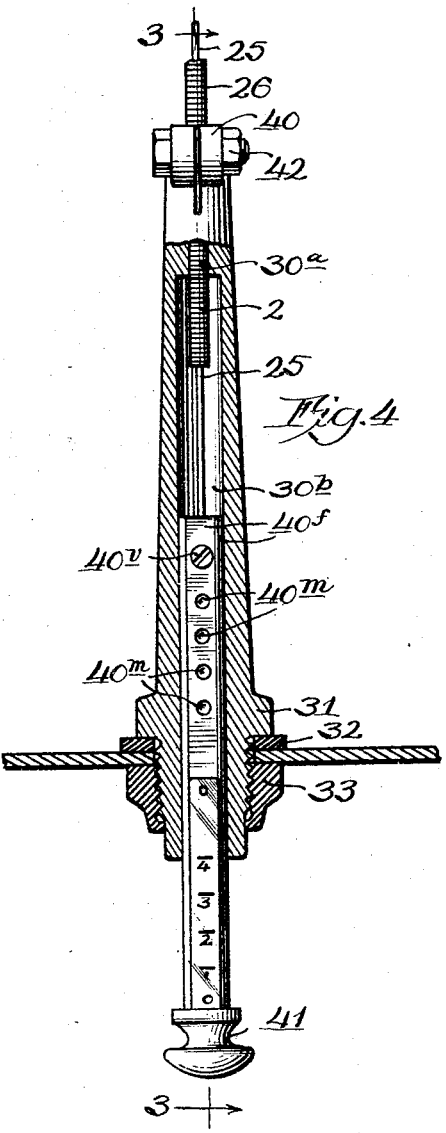
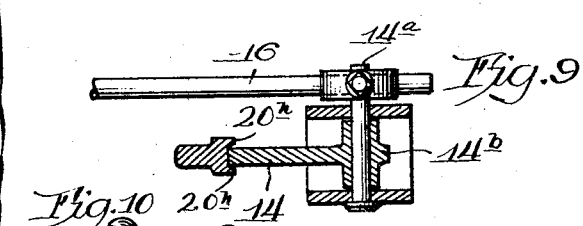
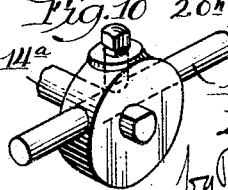
Inventor
Edward A. Rockwell
by Burton & Burton Attys.

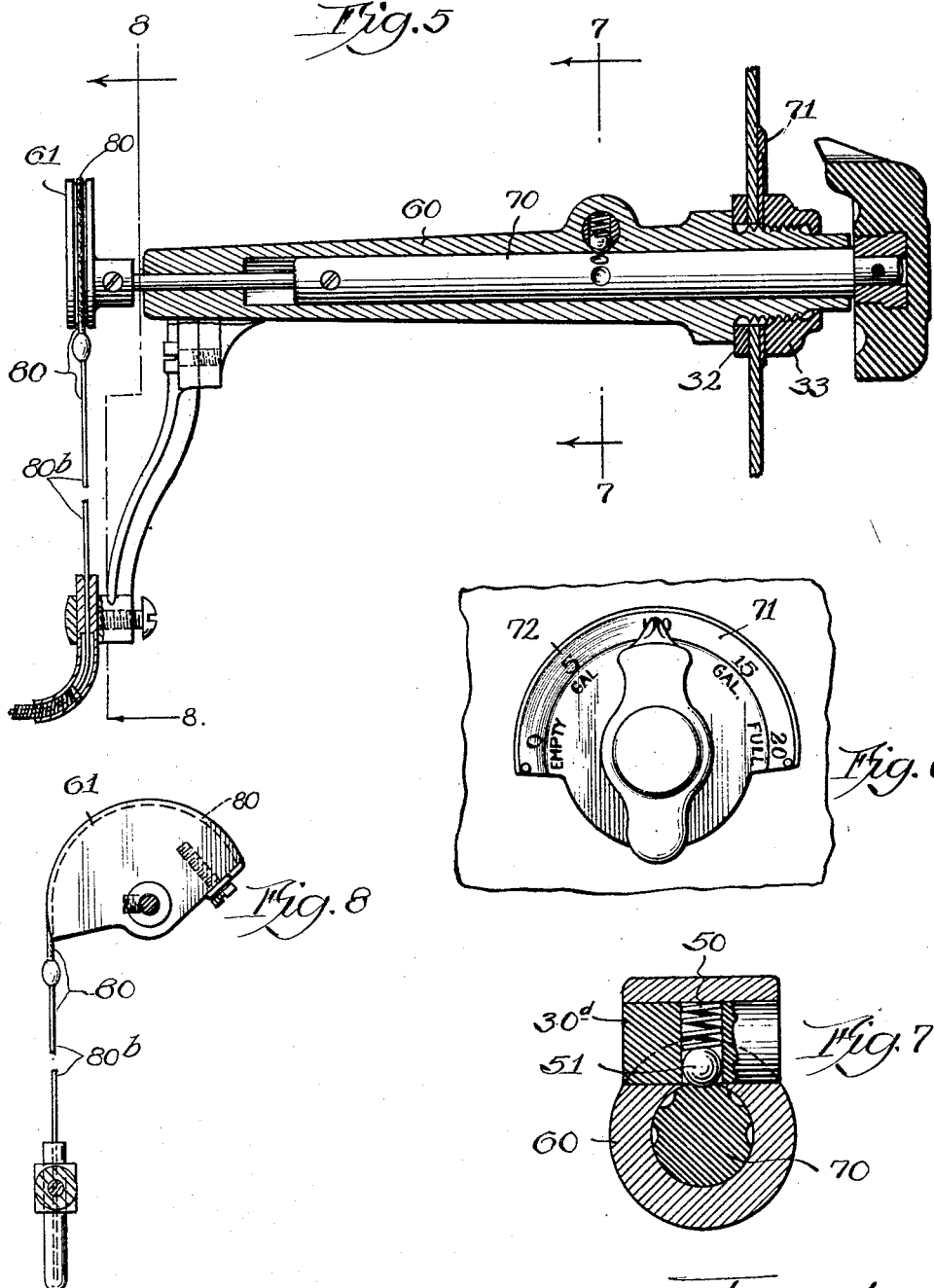

Patented Aug. 9, 1932

1,870,652

UNITED STATES PATENT OFFICE

EDWARD A. ROCKWELL, OF LONG ISLAND CITY, NEW YORK

DEPTH TESTING AND INDICATING DEVICE

Application filed December 7, 1927. Serial No. 238,246.

The purpose of this invention is to provide an improved apparatus by which the depth of liquid in a container may be reliably ascertained at a distance from the container, as of the fuel supply tank on an automobile required to be known by the driver at the steering wheel. It consists in the elements and features of construction shown and described as indicated in the claims.

In the drawings:—

Figure 1 is a vertical section of a tank containing liquid whose depth is to be ascertained, provided with a device embodying this invention, and diagrammatically shown connected to the indicating device at a distance, as on the dash of an automobile.

Figure 2 is a detail section at the line 2—2 on Figure 1.

Figure 3 is an axial section of a graduated depth-testing and indicating device mounted at the dash, the same being seen in side elevation on Figure 1.

Figure 4 is a plan section of the device shown in Figure 3 with the graduated member of the indicator at a different position.

Figure 5 is an axial section of a modified form of the construction shown in Figures 2 and 3.

Figure 6 is an elevation of the construction shown in Figure 5 looking in the direction of the arrow, 6, on that figure.

Figure 7 is a detail section at the line 7—7 on Figure 5.

Figure 8 is a detail section at the line 8—8 on Figure 5.

Figure 9 is a horizontal detail section at the line 9—9 of Figure 2.

Figure 10 is a detail perspective view of the float rod mounting.

In the structure shown in the drawings, A is the fuel tank of an automobile, B is a fitting mounted over and encompassing an opening, $a$, in the top of the tank, A, for carrying a depth-responsive device to be described. The total fitting, B, comprises two members, 10 and 11, the member, 10, being of the nature of an escutcheon designed to be riveted upon the top of the tank encompassing the opening, $a$, the member, 11, being of the nature of a cover for the opening in the escutcheon and serving as the direct means of supporting the depth-responsive device which is suspended from it through the opening, $a$, in the tank. 12 is a hanger in the form of a depending loop with parallel side bars, $12^a$, secured at its upper end, as mentioned, to the fitting cover, 11, and extending down through the opening, $a$, in the tank for mounting in the tank certain parts to be operated by a float therein for responding to and indicating depth. These depth-responsive parts comprise a disk, 14, pivotally mounted between the bars of the hanger, 12, having its pivot or rock shaft, $14^a$, extending out through one of said bars for securement thereto of a collar, 15, to which there is secured adjustably, as hereinafter explained, an arm, 16, which carries the float, 17, designed to be responsive by rising and falling movement to the depth of the liquid contents of the tank. The disk, 14, is of a form which might be described as a cam, but which is not designed to operate cam-wise, but has an eccentric periphery, $14^b$, for variably stopping a lever, 20, which is fulcrumed on the hanger, 12, and carries an abutment, $20^a$, positioned for encountering the eccentric periphery of the stop member, 14, upon being actuated for that purpose in testing the depth of the liquid contents of the tank. The lever, 20, extends up between the side bars of the hanger, 12, terminating under the cover member, 11, of the fitting, B, where there is connected to it a connector, 25, of any suitable sort for extending to the position at which it may be actuated longitudinally for operating the device in the tank for testing and obtaining indication of the depth of the liquid contents thereof. As illustrated, the connector, 25, is of the general character of the Bowden wire, having its casing, 26, mounted fixedly in the cover member, 11, for which purpose said cover member terminates at one side in an axially bored and split lug, $11^a$, in whose axial bore the casing is fitted and clamped by a clamping bolt, $11^b$, as seen in Figure 3 and 4. The connection of the Bowden wire to the end of the lever, 20, is preferably made rigidly, that is, so as not to be pivotal, the flexibility of the wire serving to accommodate the slight change of angle of the wire to the lever which occurs in swinging the lever through the limited angle of its operation.

To facilitate assembling as hereinafter described, the end of the lever, 20, has a slender hole, 20ᵉ, adapted to admit the end of the wire, 25, extending across the larger diametered hole, 20ᶠ, and a hole drilled and tapped into the end of the lever cross-wise of both the holes, 20ᵉ and 20ᶠ, receives a blunt end screw, 20ᵍ. The end of the wire being inserted through the slender bore, 20ᵉ, across the larger bore, 20ᶠ, the screw being screwed in, clinches the wire in the lever by forcing a bend into the larger diametered hole, 20ᶠ. The movement of the lever, 20, under the pull of the connector, 25, is limited independently of the dimensions of the openings in the tank, escutcheon, 10, and cover, 11, by any convenient means which may be a stop lug, 20ᵇ, struck and folded from one of the arms, 12ᵃ, for encountering the edge of the lever at said limit. A stretched spring, 28, is provided, attached at one end to the hanger, 12, and at the other end to the lever, 20, reacting on the lever for retracting the abutment, 20ᵃ, away from the eccentric periphery, 14ᵇ, of the disk, 14, and thereby holding the lever at its upper end at one limit of its range of movement in the fitting, B, the lever being stopped at that limit. The lever, 20, is preferably provided with fork arms, 20ʰ, extending from the locality of the abutment, 20ᵃ, for striding the disk, 14, to ensure encounter of the abutment with the disk.

At the dash there is mounted a fitting, 30, which is of the nature of a sleeve having an enlargement at one end, reduced in diameter and threaded at that end, as seen at 31, to form a shoulder, 32, for stopping against the forward side of the dash when the threaded end is inserted through an aperture therein for receiving at the rear side a nut, 33, for clamping the fitting securely to the dash. Said fitting is axially bored at 30ᵃ, from end to end, and counter-bored at 30ᵇ for the greater portion of its length from the rear end to constitute a sleeve as described, and in the counter-bore there is seated a plunger, 40, diametered for fitting in the counter-bore. At the rear end said plunger terminates in a threaded tang, 40ᶜ, for receiving an operating knob, 41. The Bowden wire, 25, extends in through the lesser diametered bore of the fitting and into the end of the plunger into whose forward end a slender hole is drilled as seen at 40ˣ, diametered for receiving the end of the Bowden wire, and a larger diametered hole, 40ᶻ, is drilled crosswise of the plunger and of the slender hole therein and tapped at one side of said slender hole for receiving a clinching screw, 40ᵛ, which, being screwed in after the end of the wire has been inserted in the slender hole, clinches the wire in the plunger by forcing a bend into the larger diametered bore as seen at 25ᵇ.

The fitting, 30, is apertured at its upper side as seen at 30ᵐ, for access to the end of the plunger, and the screw, 40ᵛ, in making the connection of the Bowden wire to the plunger as described. Said lesser diametered portion of the bore of the fitting, 30, is adapted for secure engagement therein of the casing, 25, of the Bowden wire connector in the same manner as above described with respect to the cover member, 11, for securing the other end of said casing, viz., by being split as seen at 40ᵈ and provided with a clamping bolt, 42, for clamping the divided end portions onto the Bowden wire casing.

The plunger, 40, is formed with a flat, 40ᶠ, at the upper side which constitutes a key seat for cooperating with a key to prevent the plunger from being rotated in the sleeve. Such key is shown at 50, being a bolt inserted transversely of the sleeve and plunger in a boss, 30ᵈ, provided and bored for that purpose. The flat, 40ᶠ, is graduated for a distance at the rear end, the graduations extending from the knob forwardly to any desired distance corresponding to the range of movement of the upper end of the lever, 15, as above described, said graduations being made to indicate either inches of depth of the liquid in the tank, or gallons of liquid contents, and being calibrated for either purpose according to the form and dimensions of the tank, and the angular movement of the eccentric disk in the rise and fall of the float between low to high liquid level. The graduated scale formed upon the flat of the plunger is necessarily of too limited area to permit large and prominent or easily readable markings, and there is therefore provided, in addition to the graduated scale on the flat, both tactual and audible means of informing the operator as to the depth or quantity of liquid contents in the tank. For this purpose there are formed in the flat at a suitable portion, preferably forward of the graduated scale, a series of depressions, 40ᵐ, for seating a ball, 51, which is carried in the cross key, 50, said key having a socket at proper position for registering with the flat, 40ᶠ, and thereby with said depressions as they successively reach the cross key in the withdrawing movement of the plunger, a spring in the socket behind the ball serving to cause the ball to snap into the sockets successively as they reach the cross key, and produce a vibration which can be felt by the operator holding the knob, and which also can be heard under favorable conditions, so that the operator, by counting the vibrations felt or heard as he withdraws the knob, may be advised as to the depth of the liquid without reading the graduated scale.

One purpose of the specific construction shown is to render it possible and convenient to install the part of the device which is designed for installation in the tank wherein the depth of liquid is to be measured, quite independently of the installation of the indicating device at the dash or elsewhere distant from the tank where the device is to be operated for testing and indicating the depth; and to permit and facilitate mounting the indicating device at the dash or wherever it is to be operated independently of the installation of the part of the apparatus which is installed at the tank; and to connect the two parts of the apparatus after each has been thus installed in its proper place by a connector of such length as may be required accordingly to the distance and the course by which the connector is most conveniently led from the one element to the other. And it will be seen that the two parts of the apparatus as above described are adapted to be thus, each independently of the other, installed in its proper place if the connector employed is adapted to be connected with said separately installed elements after they are thus installed without leaving slack of the connector between the two elements which, if it exists, would eventually defeat the accuracy and reliability of the device for its purpose. To accomplish this purpose of preventing the existence of slack in the connector when the connector consists of Bowden wire as described, the manner of installation and connection for which the construction described is adapted, is as follows:—

The wire, 25, protruding from the bowden wire casing, in inserted through the bore, 30ª, of the fitting, 30, and into the slender bore, 40ˣ, of the plunger, 40, and taking advantage of the access afforded through the opening, 30ᵐ, the wire, 25, is secured to the plunger by setting the clinching screw, 40ᵛ, and the Bowden wire casing is then drawn up and inserted and clamped in the split terminal, 40ᵈ, of the fitting, 30.

The Bowden wire casing may then be led by the desired course and positioned at the several points of support and change of direction for avoiding unnecessary length and preventing slack, which, by yielding laterally, might prevent the thrust or pull of the wire through the casing; and the casing may then be cut to length for being inserted and clamped in the split terminal lug, 11ª, of the cover member at the tank, the wire protruding a sufficient length for reaching and being attached at the end of the lever, 20, with that lever at the limit of its range of movement in the opening, a, of the tank at which it is normally held by the spring, 28.

It will be understood that the attachment of the Bowden wire to the lever, 20, and its casing, to the cover member, 11, may be made while the cover member is detached from the escutcheon, 10, the end opposite the split lug being tilted up for access to the end of the lever in attaching the wire to the latter.

The mode of operation of this construction may be understood from the foregoing description, but it will now be further described.

Upon the tank being filled with liquid, the rise of the float therein rocks the disk, 14, through an angle corresponding to the depth capacity of the tank, causing its eccentric periphery to advance toward the abutment, 20ª, carried by the lever, 20. If at this position the driver withdraws the plunger, the lever, 20, is swung a short distance for carrying the abutment, 20ª, against the eccentric edge of the disk, and the reading upon the graduated angle of the plunger will show the contents of the tank at maximum of its capacity. When subsequently a portion of the contents of the tank has been withdrawn and the driver desires to be advised of the remaining contents, upon withdrawing the plunger the lever, 20, is actuated to carry the abutment, 20ª, against the eccentric edge of the disk which by that time on account of the lowering of the float, is rocked to a position for encounter by the abutment after a movement of the lever through a distance corresponding to the lowering of the liquid level, and the graduated scale on the flat of the plunger will indicate the remaining depth or remaining liquid contents of the tank in inches of depth or in gallons, according to the calibration of the scale, that is, whether calibrated for depth or for cubic contents of the tank. It will be understood that in order that the indication may be accurate the construction must be such that the thrust of the abutment, 20ª, against the eccentric edge of the disk shall not cause any displacement of the disk from the position to which it has been rotated by the float descending from highest position or rising from lowest position in accordance with the depth of liquid in the tank. And by reference to the drawings it may be seen that the parts are so dimensioned, and the fulcrum of the lever so positioned with respect to the axis of the disk, that the impact of the abutment against the edge of the disk is at all depths and resultant positions of the disk substantially at right angles to a tangent to the disk at the point of impact; and that this angular relation is not materially different at different positions of the disk, due to different depths of liquid in the tank. To further insure against displacement of the disk by the thrust of the abutment, 20ᵇ, against the edge of the disk when that thrust is unavoidably slightly oblique to said edge, the latter is desirably finely serrated or otherwise roughened as indicated in Figure 1, wherein, however, the roughening is exaggerated in comparison with what is necessary, the actual roughening desirable being too fine to be seen in the drawings on the reduced scale necessarily employed. It will be seen, also, that the construction must be such that the movement of the plunger corresponds accurately to the movement of the abutment for coming into contact with the disk; that is, that there shall be no slack or lost motion in the connections which will permit movement of the plunger which does not cause corresponding movement of the abutment for reaching the disk. In order that this condition may be met, it will be seen that the tension of the spring, 28, by which the lever is held normally stopped at one limit of swing of the lever, must be sufficient to take up any slack or lost motion in the connections from the abutment to the graduated plunger, including the pivot of the lever in the hanger, 12. And it will be recognized that if the spring is thus tensioned, any play which may result from looseness of original construction or wear of the pivots or bearings in any of the parts, will not interfere with the accuracy of the indication obtained if throughout their range of movement the direction of stress of the parts onto their pivots, due to the withdrawal movement of the plunger, is the same as the direction of stress of the spring at normal position of the rest, so that the withdrawal of the plunger merely increases the tension without changing the direction in which it acts with respect to the pivots in the line of connection from the abutment to the plunger knob. And these conditions, it will be seen, are met in the construction as shown.

In Figures 5, 6, 7, 8, 9, and 10 there is illustrated a modification consisting in substituting a rotatable shaft for the longitudinally movable plunger, 40, and an arcuate graduated scale for the longitudinally graduated scale on the flat of the plunger, and means for winding up the connector by the rotation of the rotatable stem substituted for the longitudinally reciprocable plunger by the operator for obtaining reading on the graduated scale. This modified construction, therefore, comprises at the dash a bracket, 60, adapted for mounting on the dash, substituted for the fitting, 30; a rotatable shaft, 70, journaled in the bracket and carrying at the rear end an arcuate graduated scale, 71, co-operating with a fixed reading point, 72; said rotatable shaft having at the forward end a small windlass, 61, to which the end of the connector, 80, substituted for the Bowden wire connector, 25, is attached for being wound thereon by the shaft. The connector in this construction has its initial part, 80ª, which is wound on the windlass, 60, preferably consisting of a flexible and substantially unstretchable cord or small wire cable. The remainder, 80ᵇ, may be Bowden wire extending through suitable guide tube as seen at 83 at points of change of direction from the windlass to the lever, 20, to which it is attached fixedly in any convenient and suitable manner. It will be understood that the spring, 28, will be adapted to take up all slack in this flexible connector when the lever is against the stop at normal position of rest.

It is quite desirable that the resistance experienced by the operator in moving the manually-operated element of the indicator, whether of the form shown in the earlier figures or that shown in the later figures, should not vary widely throughout the entire range of movement, that is, whether the depth indicated is small or great; but since the resistance is that due to the tension of the spring which holds the abutment of the lever out of contact with the eccentric periphery of the part which is positioned by the float and should be at all times sufficient to take up the slack and the lost motion of the connections, it is considered of advantage that this resistance should be greatest at the depth-indicating position of the lever corresponding to the lowest level of liquid in the tank or what may be referred to as the "zero level." These results are accomplished by the construction and arrangement of the lever fulcrum with respect to the spring, or of the line of reaction of the spring with respect to the lever fulcrum at the different depth-indicating positions of the lever. The relation of said features which obtains the result is that the spring is connected as to its fixed end and its end attached to the lever, to cause the line of its reaction at the position of the lever corresponding to minimum depth of liquid in the tank to extend proximate to the lever fulcrum at the side of said fulcrum from which the lever moves and to depth-indicating positions corresponding to increased depth of liquid. The spring being stretched between its points of connection to the desired tension necessary for taking up the slack, it will be seen that with the relation stated of its line of reaction to the lever fulcrum, the greatest stretch is experienced at the first mentioned position and the stretch is slightly reduced as the lever swings from that position to positions corresponding to greater depth.

I claim:—

1. In an apparatus for the purpose indicated, in combination with a container, a depth-responsive device therein having means adapted to assume a different position according to the depth of a liquid in the container, a depth indicator adapted to be mounted independently of the container, operating connections from the depth-responsive device to the indicator, the indicator being provided with a manually operable part susceptible of greater or less movement according to the position of said means, said manually operable part having a series of recesses therein, and said indicator also including a part adapted to successively enter said recesses upon movement of the operable part, whereby to give an audible indication of the extent of said movement.

2. In an apparatus for the purpose indicated in combination with a container, a depth-responsive device therein having means adapted to assume a different position according to the depth of a liquid in the container, a depth indicator adapted to be mounted independently of the container, cooperating connections between the depth-responsive device and the indicator, the indicator being provided with a manually operable part susceptible of greater or less movement according to the position of said means, said manually operable part comprising a series of successively positioned recesses, and a spring-actuated element for projecting into said recesses successively as said movable part is manually operated, whereby there are provided successive vibrations due to the thrust into said recesses successively of said element to indicate the extent of said movement.

3. In an apparatus of the character described in combination with a liquid container, a depth-responsive device therein; a pivotally mounted element having an eccentric periphery, and operating connections to said element from the depth-responsive device for moving said element about its pivot; a lever having an abutment for encountering the eccentric periphery of said pivoted element; a spring reacting on the lever for normally holding its abutment out of contact with said eccentric periphery, and means for actuating the lever against the resistance of the spring to carry the abutment into such contact, the spring being connected for reaction on the lever in a line which extends proximate to the lever fulcrum and which is nearer to the fulcrum as the depth indicated is greater.

4. In a construction for the purpose indicated, in combination, a container, a variable stop element therein and means for varying its position according to the liquid level, means for indicating the liquid level in said container comprising a member movable from a normal rest position into contact with the variable stop element, movable means outside of the container having a series of recesses therein, and an elastically reacting member mounted in relatively fixed position in the path of movement of said movable means adapted to respond to said recesses as the said part is manually moved past it to give an audible tactual indication.

5. In combination, a container and a depth indicating apparatus therein comprising a pivotally mounted element with an eccentric outer surface and an adjustable collar, a float structure for moving the said element according to the level of the liquid connected to said element by means of the collar which is adjustably secured to the pivoted element so that said float may be rotatably adjusted about the axis of and relative to said pivotal element.

6. In combination, a container and depth indicating apparatus comprising a pivotally mounted element with an eccentric outer surface, a float for moving the same, according to the level of the liquid and means connecting it thereto, an angular lever having a projection within the angular part thereof, adapted to be brought into contact with said eccentric surface manually from time to time to indicate the depth of the liquid, and a spring for normally retracting said lever.

7. In combination, a container and a depth indicating apparatus comprising an indicator in the form of a movable rod having a flattened face with a series of recesses, a housing for said rod, the same being provided with a transverse pin adapted to cooperate with the flattened face on said rod to prevent rotation thereof, said pin having a movable plunger therein adapted to successively cooperate with said recesses upon movement of the rod whereby to give an audible indication as to the extent of said movement.

8. In combination, a container and a depth indicating apparatus comprising an indicator in the form of a movable rod having a flattened face, a housing for the same provided with a transverse pin adapted to cooperate with the flattened face on said rod to prevent rotation thereof, said flattened face having a series of recesses and a spring pressed ball in said pin for cooperating with said recesses.

In testimony whereof, I have hereunto set my hand at Chicago, Ill., this 3d day of December, 1927.

EDWARD A. ROCKWELL.